United States Patent
Wagner

(10) Patent No.: US 6,182,928 B1
(45) Date of Patent: Feb. 6, 2001

(54) METHOD FOR PLACING AN ARTIFICIAL SATELLITE ON A GEOSTATIONARY ORBIT

(75) Inventor: Alain Wagner, Le Chesnay (FR)

(73) Assignee: Societe Nationale Industrielle et Aerospatiale, Paris (FR)

(*) Notice: Under 35 U.S.C. 154(b), the term of this patent shall be extended for 0 days.

(21) Appl. No.: 09/297,180

(22) PCT Filed: Sep. 10, 1998

(86) PCT No.: PCT/FR98/01934

§ 371 Date: Apr. 27, 1999

§ 102(e) Date: Apr. 27, 1999

(87) PCT Pub. No.: WO99/14118

PCT Pub. Date: Mar. 25, 1999

(30) Foreign Application Priority Data

Sep. 12, 1997 (FR) ............................................... 97 11365

(51) Int. Cl.[7] ............................................. B64G 1/10
(52) U.S. Cl. ............................................. 244/158 R
(58) Field of Search ........................ 244/158 R, 159, 244/160, 162, 172

(56) References Cited

U.S. PATENT DOCUMENTS

| | | | |
|---|---|---|---|
| 3,995,801 | 12/1976 | Bond . | |
| 4,691,882 | * 9/1987 | Young | 244/158 R |
| 5,186,419 | 2/1993 | Scott . | |
| 5,595,360 | * 1/1997 | Spitzer | 244/158 R |
| 5,651,515 | * 7/1997 | Saccoccia et al. | 244/158 R |
| 5,927,652 | * 7/1999 | Lansard | 244/158 R |

FOREIGN PATENT DOCUMENTS

| | | |
|---|---|---|
| 0640524 | 3/1995 | (EP) . |
| 0673833 | 9/1995 | (EP) . |
| 9731822 | 9/1997 | (WO) . |

* cited by examiner

*Primary Examiner*—Galen L. Barefoot
(74) *Attorney, Agent, or Firm*—Stevens, Davis, Miller & Mosher, L.L.P.

(57) ABSTRACT

The invention concerns a method for placing an artificial satellite on a geostationary orbit injected on said orbit by a launch vehicle. The method is characterised in that the assembly consisting of the last stage (L) of said launch vehicle and satellite (S) be injected on the geostationary orbit (G) is first directly sent on a circular orbit (C), called extinction orbit, near the geostationary orbit, but sufficiently distant therefrom to avoid possible interferene with space objects already on the geostationary orbit (G), the satellite (S) is separated from said last stage (L), which stays on said extinction orbit (C), and the satellite (S) reaches the geostationary orbit (G) from said extinction orbit (C).

9 Claims, 2 Drawing Sheets

METHOD FOR PLACING AN ARTIFICIAL SATELLITE ON A GEOSTATIONARY ORBIT

Figure 1:
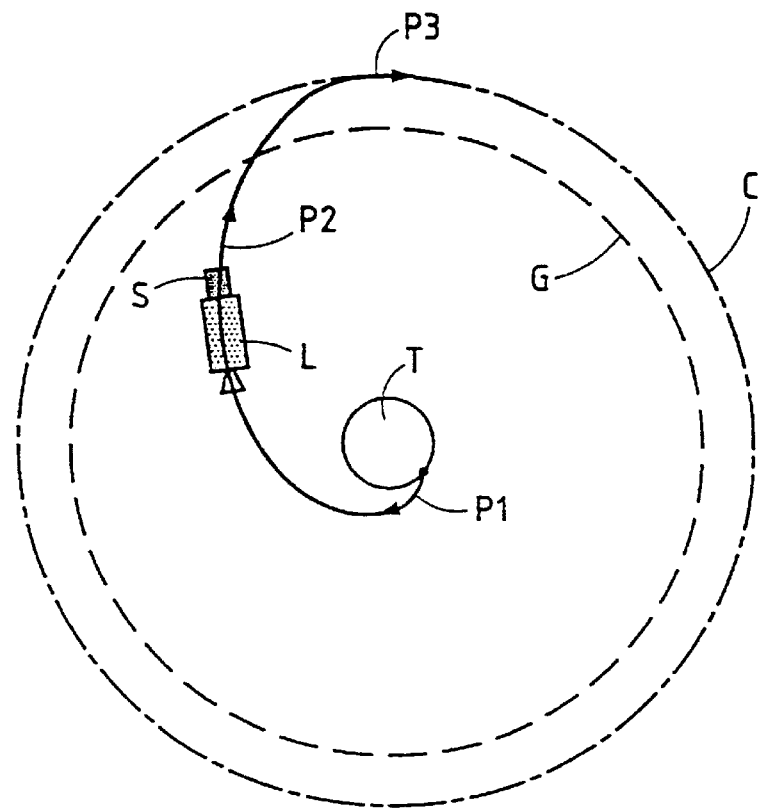

The present invention relates to a method for putting an artificial satellite in geostationary orbit.

When a satellite is intended to be positioned on a high orbit referred to as "geostationary" or "geosynchronous" (with a period of revolution of 24 hours, equal to that of the Earth), the satellite is generally installed on said orbit after having launched the satellite into geostationary transfer orbit, that is to say it then joins the geostationary orbit proper by its own means. This solution has hitherto constituted the best technical/economic compromise both for launch vehicles and for satellites.

However, new launch vehicles which are more powerful now offer the possibility of launching satellites directly into geostationary orbit. Further, the development of electrical propulsion on satellites compromises the possibility, for them, of having them transfer themselves to their final orbit because the thrust levels of electrical propulsion units are very low.

In the medium term, it is therefore probable that the standard procedure will be to launch directly into geostationary orbit. In this case, the final stage (or upper stage) of the launch vehicle needs to position the satellite or satellites directly on the geostationary orbit, then has to join a so-called "graveyard" orbit lying, for example, 300 km above the geostationary orbit, where it is neutralized so as not to create space debris. However, this raises a number of problems.

Firstly, in the case of double launching, the possibility of deploying the supporting structure on the geostationary orbit seems to be precluded. It should therefore be kept together with the upper stage to be moved subsequently to the graveyard orbit at the same time as said upper stage.

Further, after the satellite or satellites have been separated, the upper stage has to be reignited (at least once) to join the graveyard orbit. One of the scenarios for this (Hohman transfer) consists in delivering a first impulse of 5.5 m/s, in waiting about 12 hours, in delivering a second impulse of 5.5 m/s, then in neutralizing the stage. There are of course shorter scenarios, but all require reignition of the upper stage at least once and delivery of at least one impulse greater than or equal to 11 m/s.

What is more, in the event of a serious problem after the upper stage has been sent to the geostationary orbit, the latter may remain "locked" on this orbit (or even explode and create debris which is dangerous to geostationary satellites).

The object of the present invention is to overcome these drawbacks.

To this end, the method for putting in geostationary orbit an artificial satellite placed on said orbit by a space launch vehicle, is noteworthy, according to the invention, by
a) the assembly consisting of the final stage of said launch vehicle and the satellite to be placed on the geostationary orbit is firstly sent directly to a circular orbit, referred to as a graveyard orbit, close to the geostationary orbit but far enough away from the latter to avoid possible interference with space objects lying on the geostationary orbit,
b) the satellite is separated from said final stage, which remains on said graveyard orbit, and
c) the satellite joins the geostationary orbit from said graveyard orbit.

Thus, rather than the launch vehicle (final stage or upper composite of the latter) positioning the satellite directly on the geostationary orbit, it sends it to the so-called graveyard orbit. The upper stage of the launch vehicle deploys the satellite which joins the geostationary orbit by its own means (the work to be done is, however, very modest for the satellite and having an initial orbit different than its final orbit may facilitate its permanent installation). In the case of double launching, the launch vehicle deploys its supporting structure directly on the graveyard orbit (the latter does not therefore need to remain together with the upper stage). Further, since the upper stage (or final stage) is directly on the graveyard orbit, it is no longer necessary to reignite it: all that remains is to neutralize it.

Preferably, said graveyard orbit is at an altitude from a few tens to a few hundreds of kilometers away from the geostationary orbit, in particular lying about 300 kilometers above the geostationary orbit.

Further, advantageously, in step c):
the perigee of the satellite is firstly brought to the altitude of the geostationary orbit using a first impulse;
there is a waiting period of about 12 hours for the satellite to join the perigee of its new orbit, and
the apogee of the orbit of the satellite is brought to the altitude of the geostationary orbit using a second impulse.

What is more, said first and second impulses may then have the value 5.5 m/s and are retroimpulses in the case of a graveyard orbit lying above the geostationary orbit.

The figures of the appended drawing will clearly show how the invention may be embodied.

FIGS. 1 to 4 represent, very schematically, the various steps in the method for putting an artificial satellite in geostationary orbit according to the invention.

Firstly, the upper composite L of the launch vehicle with its satellite or satellites S, is placed on a so-called graveyard orbit C at, for example, 300 km above the geostationary orbit G, that is to say an orbit making it possible to avoid any interference with space objects lying on the geostationary orbit. As a reminder, it may be noted that the latter lies about 36,000 km from the surface of the earth.

Referring to FIG. 1, this step is broken down into several phases:
P1: a first propelled phase from the Earth T,
P2: a ballistic phase,
P3: a second propelled phase (circularizing on the graveyard orbit).

Figure 2:
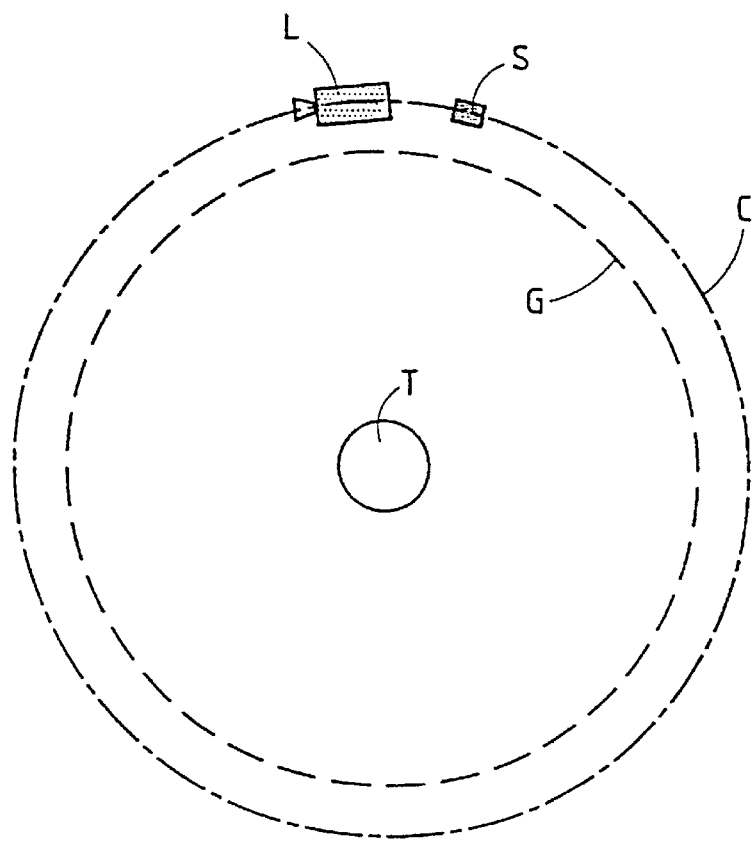
Figure 3:
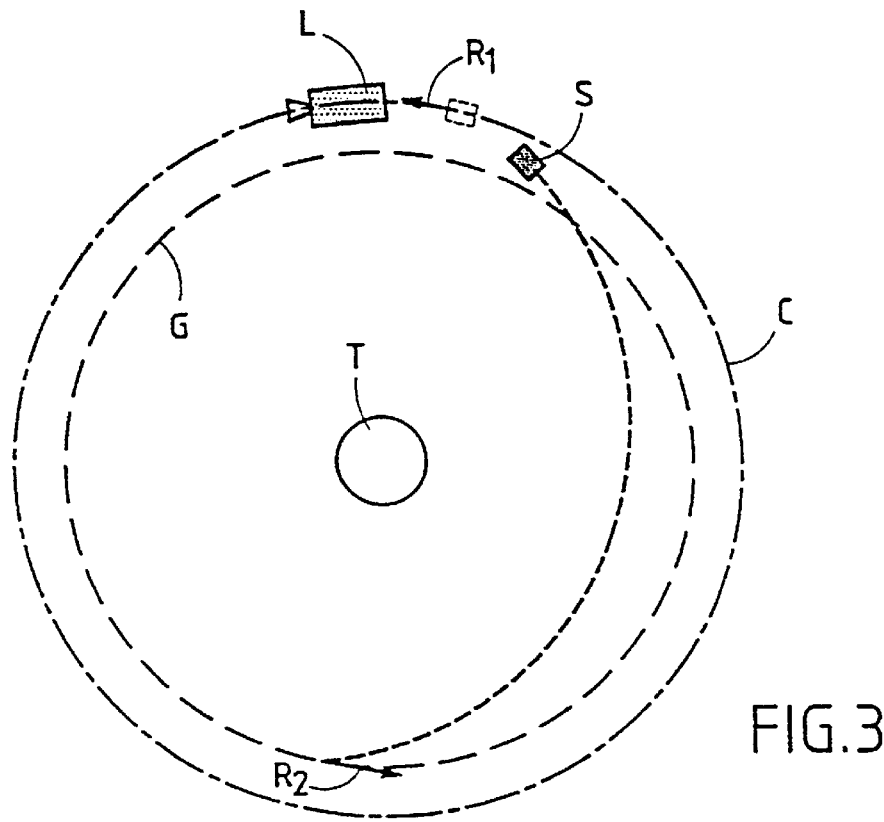

On the graveyard orbit C, the upper composite L deploys its satellite or satellites S (FIG. 2). It will be noted that the possible supporting structures of the satellites can be deployed on the graveyard orbit C, with no precaution other than not colliding with the launch vehicle or the satellites. Once its mission is completed, the upper composite L is neutralized (in particular by draining its fluids) to avoid any risk of explosion.

Each satellite S then has to join the geostationary orbit G by its own means (FIG. 3), but this requires only very modest work.

Figure 4:
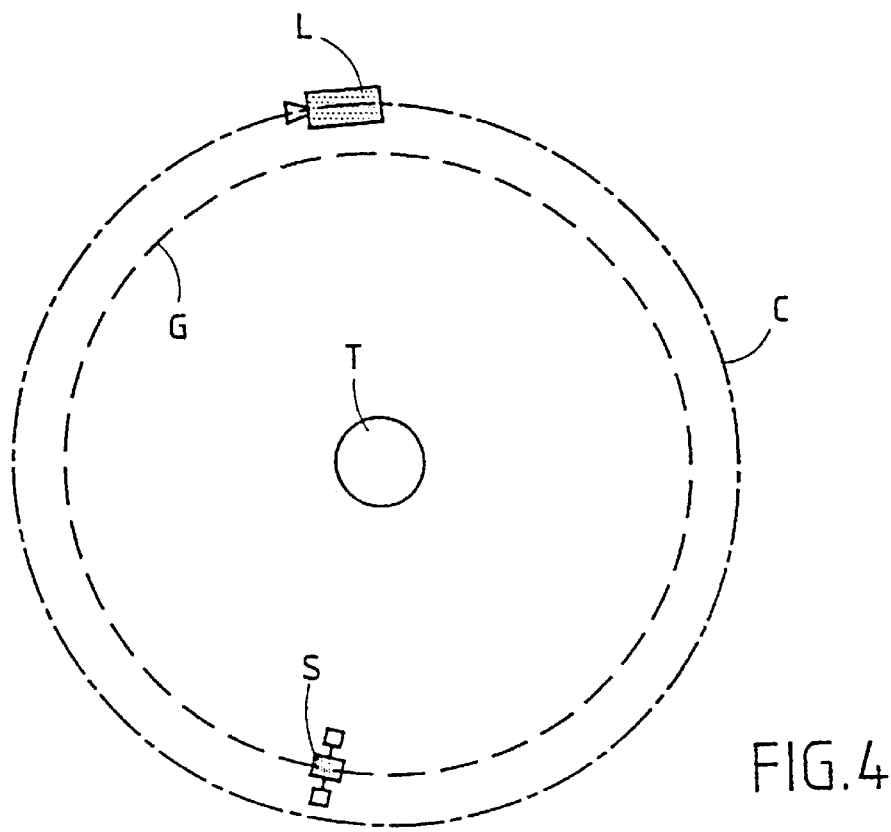

By way of nonlimiting example, with the assumption of a Hohman transfer from a graveyard orbit C lying, for example, 300 km above the geostationary orbit G, the following scenario is obtained:
firstly, the perigee of the orbit of the satellite or satellites is lowered by (for example) 300 km (this means that the perigee is positioned at the altitude of the geostationary orbit G) using a retroimpulse R1 of, for example, 5.5 m/s (first propelled phase of the satellite, namely deorbiting),
there is a waiting period of about 12 hours (one half of the orbital period) for the satellite to join the perigee of its new orbit G, the apogee of the orbit of the satellite is lowered by 300 km (this means that the satellite is positioned on the geostationary orbit G) using a retroimpulse R2 of 5.5 m/s (second propelled phase of the satellite, namely circularizing), the satellite S is then on the geostationary orbit G and can commence its installation (FIG. 4).

What is claimed is:

1. A method for putting in geostationary orbit an artificial satellite placed on said orbit by a space launch vehicle, said method comprising:

(a) sending an assembly including the final stage of the launch vehicle and the satellite to be placed on the geostationary orbit to a graveyard orbit;

(b) separating said satellite from said final stage while maintaining said final stage on said graveyard orbit; and (c) thereafter, causing said satellite to join the geostationary orbit from said graveyard orbit.

2. The method according to claim 1, wherein step (a) firstly sends said assembly to said graveyard orbit.

3. The method according to claim 1, wherein said graveyard orbit is circular.

4. The method according to claim 1, wherein said graveyard orbit is close to the geostationary orbit but far enough away from the geostationary orbit to avoid possible interference with space objects lying on the geostationary orbit.

5. The method according to claim 1, wherein said graveyard orbit is at an altitude from a few tens to a few hundreds of kilometers away from the geostationary orbit.

6. The method according to claim 4, wherein said graveyard orbit lies about 300 kilometers above the geostationary orbit.

7. The method according to claim 1, wherein step (c) further comprises:

(i) bringing the perigee of said satellite to the altitude of the geostationary orbit using a first impulse which puts said satellite into a new orbit;

(ii) waiting for a period of about 12 hours for said satellite to join the perigee of said new orbit; and (iii) thereafter, bringing the apogee of the new orbit of said satellite to the altitude of the geostationary orbit using a second impulse.

8. The method according to claim 6, wherein said first and second impulses have a value of 5.5 m/s.

9. The method according to claim 6, wherein said first and second impulses are retroimpulses.

* * * * *

UNITED STATES PATENT AND TRADEMARK OFFICE
CERTIFICATE OF CORRECTION

PATENT NO.    : 6,182,928
DATED         : February 6, 2001
INVENTOR(S)   : Alain WAGNER It is certified that error appears in the above-identified patent and that said Letters Patent is hereby corrected as shown below:

Assignee [73] should be "AEROSPATIALE SOCIETE NATIONALE INDUSTRIELLE" not SOCIETE NATIONALE INDUSTRIELLE ET AEROSPATIALE.

Signed and Sealed this

Fifth Day of June, 2001

Attest:

NICHOLAS P. GODICI

*Attesting Officer*

*Acting Director of the United States Patent and Trademark Office*